(12) United States Patent
Brunken

(10) Patent No.: US 6,269,925 B1
(45) Date of Patent: *Aug. 7, 2001

(54) VISCOUS COUPLING WITH A VOLUMETRIC-FLOW SETTING MEANS

(75) Inventor: Gerd Brunken, Dittelbrunn (DE)

(73) Assignee: Mannesmann Sachs AG, Schweinfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,665

(22) Filed: Jun. 29, 1999

(30) Foreign Application Priority Data

Jul. 15, 1999 (DE) .............................. 198 31 754

(51) Int. Cl.[7] ................................................. F16D 35/02
(52) U.S. Cl. ...................... 192/21.5; 192/58.61; 192/58.8
(58) Field of Search ............................... 192/21.5, 58.61, 192/58.8; 137/807, 251.1, 909

(56) References Cited

U.S. PATENT DOCUMENTS

| | | |
|---|---|---|
| 2,541,831 | 2/1951 | Prince . |
| 3,448,751 * | 6/1969 | Rosaen ................................. 137/807 |
| 4,898,266 | 2/1990 | Garrett et al. ........................ 192/21.5 |
| 5,598,908 | 2/1997 | York et al. ........................... 192/21.5 |
| 5,816,376 * | 10/1998 | Hattori ................................ 192/58.61 |

FOREIGN PATENT DOCUMENTS

| | | | |
|---|---|---|---|
| 25 33 893 | 2/1976 | (DE) | ................................ F16D/37/02 |
| 39 21 854 A1 | 1/1991 | (DE) | ................................ F16B/1/00 |
| 196 45 478 A1 | 5/1998 | (DE) | ................................ F16D/35/00 |
| 0 317 186 B1 | 11/1988 | (EP) | ................................ F01P/7/04 |
| 0 317 186 A2 | 5/1989 | (EP) . | |
| 0 356 145 A2 | 2/1990 | (EP) . | |
| 0 395 007 | 10/1990 | (EP) | ................................ F16D/37/02 |
| 0 882 903 | 12/1998 | (EP) | ................................ F16D/37/02 |
| 0 882 904 | 12/1998 | (EP) | ................................ F16D/37/02 |
| 7-259891 (A) * | 10/1995 | (JP) . | |

OTHER PUBLICATIONS

Patent Abstracts of Japan, Jun. 28, 1991 vol. 15/No. 257.

* cited by examiner

*Primary Examiner*—Richard M. Lorence
(74) *Attorney, Agent, or Firm*—Cohen, Pontani, Lieberman & Pavane

(57) ABSTRACT

A viscous coupling is designed with a coupling housing and at least one drivable rotor, which is provided for the transmission of torque via shearing areas in a working chamber filled with viscous fluid. This working chamber is partitioned from a supply chamber for viscous fluid by a dividing wall. The viscous fluid can be delivered from the working chamber via a pumping into the supply chamber or from the supply chamber via a feed line. A volumetric-flow setting device having an electromagnetic adjusting device operably complete with the feed line back into the working chamber. The feed line, at least along part of its extension length, is directed through a region in which a magnetic field can be produced by the electromagnet. The viscous fluid is enriched with magnetizable particles, in, order to realize a magnetorheological behavior. As a result the flow velocity of the viscous fluid in tie feed line, when flowing through the magnetic field, can be varied as a function of the intensity of the applied magnetic field, this enables the volumetric flow between supply chamber and working chamber to be selectively, dynamically set.

5 Claims, 1 Drawing Sheet

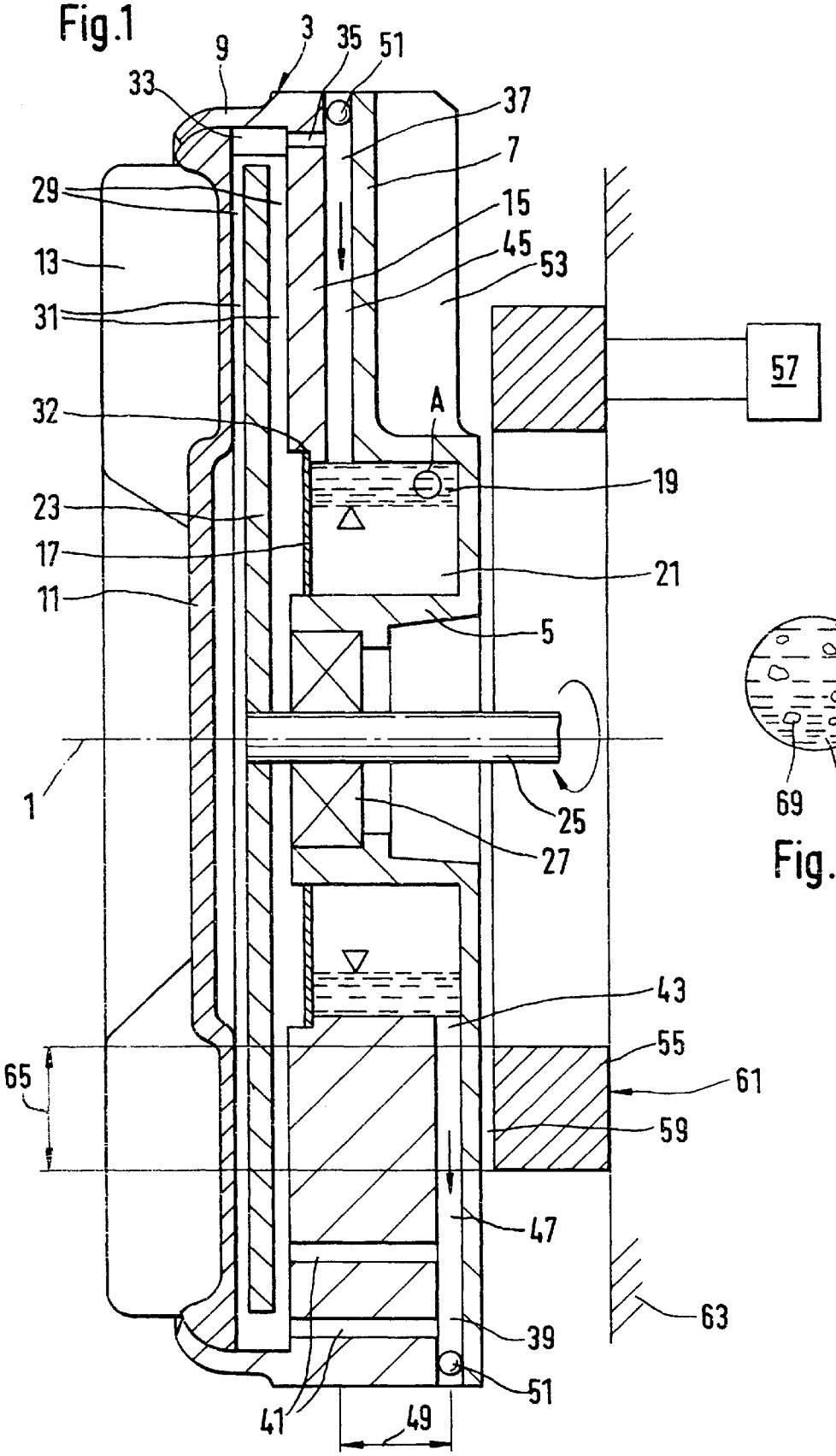

VISCOUS COUPLING WITH A VOLUMETRIC-FLOW SETTING MEANS

BACKGROUND OF THE INVENTION

1. Field of the Invention

The invention relates to a viscous coupling in a torque transmitting device

2. Description of the Related Art

DE 196 45 478 A1 discloses a viscous coupling having a coupling housing and a drivable rotor, which is arranged therein and is provided for the transmission of torque via shearing areas in a working chamber filled with viscous fluid. This working chamber is partitioned off from a supply chamber for viscous fluid by a dividing wall. The viscous fluid can be directed from the working chamber via a pumping opening into the supply chamber or from the supply chamber via a feed line back into the working chamber. The feed line interacts with a control opening, which can be varied in its width by a lever of a valve operable by an electromagnet. As soon as the lever comes to bear on the control opening, the volumetric flow of the viscous fluid between the supply chamber and the working chamber ceases so that the working chamber is emptied due to the effect of the pumping opening and thus the torque-transmitting capacity decreases. At the other extreme, the lever is completely lifted from the control opening so that the working chamber can rapidly fill with viscous fluid from the supply chamber and the torque-transmitting capacity approaches a maximum. The position of this lever can be set by the electromagnet. Therefore, the electromagnet together with the valve having the lever is effective as a volumetric-flow setting means for the viscous fluid between supply chamber and working chamber.

Such a valve is relatively complicated and, on account of the lever affected by mass, sluggish, so that setting operations proceed relatively slowly. At the same time, the electromagnet, has to be very powerful on account of its distance from the lever of the valve, which distance is normally large, this configuration has unfavorable consequences for its dimensioning.

EP 0 317 186 B1 discloses a viscous coupling which does without such a valve and also (does without a supply chamber for viscous fluid. Instead, the viscous fluid, in the embodiment according to FIG. 3, is magnetorheological, with its viscosity being variable by means of an electromagnet provided on side of the viscous coupling facing a drive, such as, for example, an internal combustion engine. The torque-transmitting capacity of the viscous coupling can thus be influenced.

It is known that such a magnetorheological viscous fluid is formed by magnetizable particles, such as, for example, iron particles, being introduced into a carrier medium. When current is applied to the electromagnet, these magnetizable particles become interlinked under the effect of the magnetic field. The result of which is a high viscosity of the viscous fluid can be achieved. Conversely, however, if no torque transmission is desired at the viscous coupling, the magnetic field must be switched off in order to neutralize the effect of the magnetizable particles. However, since the working chamber has still not been emptied by this measure, the torque-transmitting capacity, although reduced, is not neutralized. The consequence of this is undesirable running of the coupling housing with the rotor during rotation of the rotor. This problem may be remedied by a very thin-bodied carrier fluid being used. Although the maximum torque-transmitting capacity of the viscous coupling is in turn considerably reduced.

A further problem turns out to be that the electromagnet must also act on the viscous fluid which is located in the part of the working chamber axially on the other side of the rotor. The electromagnet must be moved correspondingly close to the coupling housing, so that there is no possibility of forming cooling blades on the corresponding side of the coupling housing. During operation with high slip, the viscous coupling is thus constantly exposed to the risk of overheating. Furthermore, recourse must be had to a very powerful and therefore correspondingly expensive and heavy electromagnet.

SUMMARY OF THE INVENTION

The object of the invention is to design a viscous coupling such that a virtually inertia-free setting of the torque-transmitting capacity can be realized with the least possible design and production outlay and high maximum torque-transmitting capacity is achieved.

This and other objects are achieved according to the invention by enrichment of the viscous fluid with magnetizable particles, a magnetorheological behavior is achieved for this viscous fluid. However, the variation in the viscosity of this fluid is not used directly for varying the torque-transmitting capacity but for setting the flow velocity in a feed line which leads from a supply chamber of the viscous coupling into a working chamber. In accordance with the intensity of a magnetic field in the extension region of the feed line, the viscous fluid can be braked and, in the extreme case, even stopped by corresponding activation of an electromagnet, so that a "magnetized fluid plug" forms virtually inside the feed line, which at best, permits an insignificantly small leakage flow from the supply chamber into the working chamber. Conversely, if the electromagnet is switched off and thus the effect of the magnetizable particles in the viscous fluid is neutralized, the viscous fluid, with its actual viscosity, flows through the feed line without hindrance and thus the working chamber is supplied with adequate viscous fluid originating from the supply chamber. Of course, during appropriate activation of the electromagnet, any intermediate values with regard to the flow velocity of the viscous fluid and therefore its volumetric flow can also be set between these two extremes described. The magnetizable particles in the viscous fluid therefore come into effect in such a way as corresponds to the valve in DE 196 45 478 A1 described previously. On account of the low mass of the magnetizable particles and the potential high operating frequency of the electromagnet (which consequently serves as a volumetric-flow setting means) such setting operations can be carried out virtually free of inertia. The torque-transmitting behavior of the viscous coupling can be varied in a correspondingly rapid manner.

The feed line is preferably a two-piece design. More specifically, a first line section leads to the supply chamber from a pumping opening assigned to the working chamber, and a second line section which leads from the supply chamber back to the working chamber. The arrangement of these two line sections with an axial offset relative to one another makes it possible to move one line section, preferably the second, spatially close to the electromagnet of the volumetric-flow setting means, while the other line section (i.e., preferably the first), is further away from the electromagnet. This configuration provides a space for cooling blades on the coupling housing remaining axially between the electromagnet and the corresponding line section. However, the greater distance between the first line section and the electromagnet is also of considerable importance with regard to the fact that this line section must run outside the magnetic field. The reason for this lies in the fact that the pumping of viscous fluid out of the working chamber into the supply chamber must, by all means, be maintained when the electromagnet is switched on for producing the magnetic field in the extension region of the second line section in order to ensure emptying of the working chamber. Since both line sections lead out into the supply chamber, and the line section connecting the supply chamber to the working chamber preferably leads out in the peripheral region of the working chamber in order to help it fill quickly, both line sections run in comparable radial regions of the coupling housing, but are offset relative to one another in the peripheral direction. This likewise ensures: (i) that a magnetic field which is highly effective for the fed line is built up at the second line section by a very light and low-power electromagnet; (ii) that there is an adequate cooling means even during relatively pronounced slip in the working chamber; and (iii) that the magnetic field of the electromagnet is kept away from the first line section.

An especially simple design of the above-mentioned line sections of the feed line is obtained when these line sections are each formed by radial bores.

Since the torque-transmitting capacity in the present viscous coupling is set solely via the degree of filling of the working chamber, the viscous fluid used is preferably a mineral oil or a silicone oil of at least average viscosity in order to ensure a high torque-transmitting capacity. A magnetically dependent behavior of the viscous fluid in the working chamber is not necessary, so that it is possible to use a relatively weak electromagnet.

The various features of novelty which characterize the invention are pointed out with particularity in the claims annexed to and forming a part of the disclosure. For a better understanding of tie invention, its operating advantages, and specific object attained by its use, reference should be had to the drawing and descriptive matter in which there are illustrated and described preferred embodiments of the invention.

BRIEF DESCRIPTION OF THE DRAWINGS

The invention is explained in more detail with reference to a drawing, in which:

FIG. 1 is a sectional view of a viscous coupling according to an embodiment of the invention; and FIG. 2 is an enlarged detail view of a viscous-fluid section according to the present invention.

DETAILED DESCRIPTION OF THE PREFERRED EMBODIMENTS

The vixens coupling shown in FIG. 1 has a coupling housing 3, which is rotatable about an axis of rotation 1 and is centered via a housing hub 5 and a bearing 27 relative to a drive shaft 25, which is likewise rotatable about the axis of rotation 1. Adjoining the housing hub 5 radially to the outside is a rear wall 7, which merges in the peripheral region into an axial extension 9. At its free end, axial extension 9 accommodates a housing cover 11, on which cooling blades 13 are formed. A radial web 15 is likewise integrally formed on the axial extension 9 axially between the rear wall 7 and the housing cover 11. Radial web 15 runs radially inward and accommodates a sealing ring 17 radially between itself and the housing hub 5. Sealing ring 17 serves as an axial boundary of a supply chamber 21 at least partly filled with viscous fluid 19. The supply chamber is defined on the other side by the housing hub 5.

A rotor 23 is disposed axially between the radial web 15 and the housing cover 11, and runs radially outward starting from the drive shaft 25. One shearing gap 29 remains axially between the housing cover 11 and the rotor 23 on the one hand and between the rotor 23 and the radial web 15 on the other hand. These shearing gaps 29 together form a working chamber 31. The supply chamber 21 and the radial web 15, together with the sealing ring 17, are effective as dividing wall 32. Returning to the working chamber 31, a retaining body 33 is fastened in its peripheral region radially outside the rotor 23 to the inside of the axial extension 9 of coupling housing 3. Retaining body 33 interacts with a pumping opening 35 running axially next to it and formed in the radial web 15. Pumping opening 35 leads out into a first radial bore 37, which leads radially inward into the supply chamber 21. Leading radially outward from supply chamber 21 is a second radial bore 39, which leads out into working chamber 31 via discharge openings 41, which are preferably formed in the peripheral region of the working chamber 31. In this case, the first radial bore 37 is effective as first line section 47 of a feed line 43, and the second radial bore 39 is effective as second line section 45 of the feed line 3. The radial bores 37 and 39 are each tightly closed in their peripheral region by balls 51.

The two radial bores 37 and 39 are arranged with an axial offset 49 relative to one another, to be precise they are displaced relative to one another as viewed over the periphery of the coupling housing 3. This makes it possible to move the first radial bore 37 axially well away from an electromagnet 55, which is arranged on the rear side of the coupling housing 3 and may be formed, for example, by a magnet coil and is connected to a control device 57, by means of which control currents can be input to the electromagnet 55. Axial construction space remains due to said large distance between the first radial bore 37 and the electromagnet 55, and this construction space is utilized to form cooling blades 53 on the rear wall 7 of the coupling housing 3. This provides for sufficient cooling demand at the rear side of the viscous coupling even during considerable slip of the coupling housing 3 relative to the rotor 23. In addition, the first radial bore 37 is thereby kept away from the effective region of the magnetic field which can be produced by the electromagnet 55, so that, when the electromagnet 55 is switched on, the working chamber 31 can be emptied into the supply chamber 21 via the pumping opening 35 without hindrance.

On the other hand, the second radial bore 39 is brought very close to the electromagnet 55, so that only the rear wall 7 of the coupling housing 3 and a minimum air gap 59 remain between the electromagnet 55 and the radial bore 39. When current is applied to the electromagnet 55, it produces a magnetic field, the radial extension region of which is indicated by the reference numeral 65 by way of example and which extends in the axial direction over the entire axial width of the second radial bore 39. In a manner to be explained in more detail below, the electromagnet 55 is effective as a volumetric-flow setting means 61 for viscous fluid which is directed from the supply chamber 21 via the second radial bore 39 and the discharge openings 41 into the working chamber 31.

It may additionally be noted that the electromagnet 55 of the volumetric-flow setting means 61 may be fastened to a drive 63, such as, for example, the internal combustion engine of a motor vehicle.

FIG. 2 indicates the structure of the viscous fluid. The viscous fluid has a carrier medium 67 in the form of a mineral oil or silicone oil, which is suitable for the torque transmission between rotor 23 and coupling housing 3. The carrier medium 67 is enriched by magnetizable particles 69 and thus exhibits a magnetically dependent behavior in the extension region of a magnetic field. This behavior is utilized in the region 65 of the magnetic field produced by the electromagnet 55.

As soon as there is a relative movement between the rotor 23 and the coupling housing 3 of the viscous coupling, a positive pressure is built up at the retaining body 33. As a result of the positive pressure viscous fluid is pumped Out of the working chamber 31 via the pumping opening 35 and flows via the first radial bore 37 into the supply chamber 21. From there, the viscous fluid, as a function of the centrifugal force, attempts to flow radially outward via the second radial bore 39 in order to be fed again to the working chamber 31 via the discharge openings 41. This feeding of the viscous fluid from the supply chamber 21 into the working chamber 31 is effected without hindrance as long as the electromagnet 55 is switched off. The working chamber 31 fills up rapidly. On the other hand, as soon as current is applied to the electromagnet 55 via the control device 57, and thus a magnetic field is produced in the region 65, the magnetizable particles 69 in the viscous fluid are interlinked with one another such that the viscosity of the viscous fluid becomes greater and flows through the region 65 with considerably reduced flow velocity. As a result, the volumetric flow of the viscous fluid between the supply chamber 21 and the working chamber 31 is reduced. If a higher current is accordingly applied to the electromagnet 55, it may even produce a "magnetizable fluid plug", which in concrete terms means that the viscous fluid located in the region 65 is held in a fixed position within second radial bore 39 and at most lets through an insignificantly small leakage flow of viscous fluid from the supply chamber 21 radially outward into the working chamber 31. The consequence of this is that the working chamber 31 is emptied via the pumping opening 35, but at the same time fresh viscous fluid can no longer subsequently flow out of the supply chamber 21 via the discharge openings 41. With the emptying of the working chamber 31, the torque-transmitting capacity of the viscous coupling drops.

In order to subsequently increase the torque-transmitting capacity again, it is sufficient to reduce or completely neutralize the current load on the electromagnet 55 and thus, weaken or completely neutralize the magnetic field. In this respect, the electromagnet 55 is part of the volumetric-flow setting means 61.

The invention is not limited by the embodiment described above which are presented as examples only but can be modified in various ways within the scope of protection defined by the appended patent claims

I claim:

1. A viscous coupling comprising:

a housing;

a working chamber disposed is said housing and being filled with a viscous fluid, said viscous fluid having magnetizable particles disposed therein;

at least one drivable rotor disposed in said working chamber and having shearing areas for transmitting torque;

a supply chamber separated from said working chamber by a dividing wall, said supply chamber containing the viscous fluid;

a pumping opening connecting said supply chamber with said working chamber for delivering said viscous fluid from said working chamber to said supply chamber;

a first feed line having a length and connecting said supply chamber with said working chamber for delivering viscous fluid from said supply chamber to said working chamber; and volumetric-flow setting means positioned along at least a part of the length of said first feed line and comprising an electromagnet generating a magnetic field in a magnetic field region through which said part of the length of the first feed line extends, wherein a flow velocity of the viscous fluid flowing in said first feed line through said magnetic field is variable as a function of an intensity of said magnetic field in said magnetic field region, wherein said first feed line comprises a first feed line section leading to said supply chamber and a second feed line section connecting said supply chamber to said working chamber, said second feed line section being axially offset from said first feed line section in a direction of said volumetric-flow setting means, and wherein said first and second line sections of said first feed line comprise radial bores.

2. The viscous coupling in accordance with claim 1, wherein said volumetric setting means can reduce the flow velocity of the viscous fluid in the first feed line to substantially zero by increasing the magnetic field applied in the magnetic field region.

3. The viscous coupling in accordance with claim 1, wherein said electromagnet comprises a magnet coil.

4. The viscous coupling in accordance with claim 1, further comprising at least one discharge opening assigned to said feed line in an extension region of the working chamber, said discharge opening leading out of said working chamber in a radially outer region of the same.

5. The viscous coupling in accordance with claim 1, wherein said viscous fluid comprises a carrier medium for said magnetizable particles, said carrier medium comprising one from a group consisting of mineral oil and silicone oil.

* * * * *

UNITED STATES PATENT AND TRADEMARK OFFICE
CERTIFICATE OF CORRECTION

PATENT NO.   : 6,269,925 B1
DATED        : August 7, 2001
INVENTOR(S)  : Gerd Brunken Page 1 of 1

It is certified that error appears in the above-identified patent and that said Letters Patent is hereby corrected as shown below:

<u>Title page,</u>
Please delete Item [30], Foreign Priority Data, and replace with the following:
-- Jul. 15, 1998 (DE) .............................. 198 31 754 --

Signed and Sealed this

Fourteenth Day of May, 2002

*Attest:*

*Attesting Officer*

JAMES E. ROGAN
*Director of the United States Patent and Trademark Office*